United States Patent
Matera

[11] Patent Number: 5,963,296
[45] Date of Patent: Oct. 5, 1999

[54] DETACHABLE CAM-BIASED EYEGLASS TEMPLES

[75] Inventor: Pasquale J. Matera, Plainview, N.Y.

[73] Assignee: J. W. Envisions, Inc., Huntingdon Valley, Pa.

[21] Appl. No.: 09/076,830

[22] Filed: May 13, 1998

[51] Int. Cl.⁶ ..................................... G02C 5/14
[52] U.S. Cl. .......................... 351/116; 351/113; 351/153
[58] Field of Search ................... 351/111, 113, 351/114, 116, 119, 121, 140, 153; 16/228

[56] References Cited

U.S. PATENT DOCUMENTS

| | | | |
|---|---|---|---|
| 2,210,507 | 8/1940 | Spill | 351/153 |
| 3,899,840 | 8/1975 | Maillet | 351/113 |
| 4,153,347 | 5/1979 | Myer | 351/90 |
| 4,605,293 | 8/1986 | Blumenthal | 351/153 |
| 4,832,478 | 5/1989 | Salce | 351/121 |
| 4,895,438 | 1/1990 | Zider et al. | 351/153 |

FOREIGN PATENT DOCUMENTS 954467  12/1949  France ................................. 351/153

Primary Examiner—Huy Mai
Attorney, Agent, or Firm—Gregory J. Gore

[57] ABSTRACT

An eyeglass construction includes a hinge joint and temple bars with spreadable jaws with apertures that receive frame hinge pins. A unique key-and-lock mechanism is provided for spreading the temple jaws and holding them apart while interchangeable temple bars are removed and installed. A separate key having a lobe-shaped shank with an elliptical profile corresponds to a similar aperture through a slot in each temple bar so that when the key is turned, the jaws at the end of the temple bar are spread apart and held in a retracted state. A simple internal leaf spring molded into the temple bar bears upon a cam surface of the eyeglass frame so that a positional biasing of the temple bar is achieved.

13 Claims, 5 Drawing Sheets

DETACHABLE CAM-BIASED EYEGLASS TEMPLES

FIELD OF THE INVENTION

The present invention relates to eyeglass frames having resilient hinged temple bars making the frames foldable. More specifically, it relates to foldable resilient eyeglass hinges which are molded from a resilient material and are detachable.

BACKGROUND OF THE INVENTION AND DESCRIPTION OF PRIOR ART

It is well-known in the field of eyeglass manufacture to construct eyewear, such as eyeglasses, sunglasses, goggles, etc., with resilient hinge joints between the eyeglass frame and the temple bar so that the eyeglasses fold when not in use. Resilient means acting upon the hinged joints have also been employed to hold the temple bar in a folded condition or biased to the open position, or both. The biasing has been accomplished in many ways, including the use of cams acting upon resilient members, such as metal coil springs, to achieve their purpose. There have been efforts to replace the more complicated and expensive metal coil spring structures with molded-in metal leaf springs which also employ an intermediate roller such as taught in U.S. Pat. No. 4,605,293. There is, however, heretofore not been devised an inexpensive one-piece molded cam and spring hinge joint that functions adequately.

There have also been various attempts to create eyeglass hinge joints in which the temple members are detachable from the frames at the hinge joint. The use of resilient material for the temple bars has permitted snap-over joints where jaws of the temple frames are spread apart and fitted over top and bottom pins located on the frame member half. Similarly, these corresponding structures have been reversed between the respective elements of the hinge mechanism with the same result.

Examples of this technology is disclosed in several U.S. patents. U.S. Pat. No. 4,153,347 discloses an eyeglass hinge pin having an angled surface which wedges spreadable temple jaws apart upon insertion. U.S. Pat. No. 2,210,507 discloses the use of a spreadable outer hinge element fitted around temple bar hinge pins. Insertion is made easier by rounding the ends of the pins to reduce friction and provide a wedging effect during insertion. U.S. Pat. No. 4,832,478 shows the use of a hinge assembly for an eyeglass frame in which the spreadable hinge leaves on the temple bar include ramps to guide a frame-mounted hinge pin and spread the temple bar leaves as the hinge pin is inserted. There is difficulty with these hinged joints, however, because to spread the outer hinge apart takes a great deal of force to accomplish. Thus, attachment and removal is difficult. Efforts to reduce the attachment force by providing insertion ramps or rounded pin ends can cause a joint to come apart too easily. There is therefore a need in the art for a detachable eyeglass frame/temple hinge joint which may be easily removed when desired, but which after installation provides secure attachment between the hinged parts.

SUMMARY OF THE INVENTION

In order to meet the needs in the art described above, the present eyeglass hinge joint has been devised. In one embodiment of the present invention, right and left sides of an eyeglass frame each carries a rear-facing lug having a cam surface, and top and bottom vertical hinge pins. Temple bars include spreadable jaws with apertures to receive the frame hinge pins; however, unlike the prior art, the present invention utilizes a unique slot-and-key mechanism for spreading the temple jaws and holding them apart while the temple bars are removed or installed. The present system includes a separate key having a lobed-shaped shank with an elliptical profile which corresponds to an elliptical aperture located toward the base of the slot between the spreadable jaws of the temple bar to hold them in a retracted state. Notches in the surface of the keyhole hold the retraction key in position so that the key becomes gripped by the temple bars at the point of full retraction and, hence, temporarily held thereto during installation. This provides easy hand placement of the temple bars over the eyeglass frame hinge pins when they are installed.

Another important aspect of the present invention is the use of a simple integral leaf spring molded into the temple bar which bears upon a cam surface of the eyeglass frame lug so that a desired positional biasing of the temple bar is achieved. The resilient nature of the molded material which permits the use of detachable temple bars also provides the unitary leaf spring structure with its required resilience. By the use of the proper material, both of the attributes of attachability and positional biasing can be achieved in a single form of the hinge without the need for other parts. Thus, the present invention provides not only multi-functional attributes, but also economy of manufacture. Never before has this been effectively achieved.

Other objects, advantages and novel features of the invention will become apparent from the following detailed description of the invention when considered in conjunction with the accompanying drawings.

DESCRIPTION OF THE PREFERRED EMBODIMENT

In general, the two hinge joints of the eyewear of the present invention described below operate identically to corresponding structures that are mirror images of each other. Therefore, the following description of the preferred embodiment need only be taken with regard to one of the two hinge joints of the described eyeglasses. Furthermore, each joint is symmetrical about a horizontal midline with top and bottom halves that likewise have identical structures that function the same. It should therefore be understood when reading the following description, that the description and operation of structures also applies to their mirror image counterparts.

Figure 1:
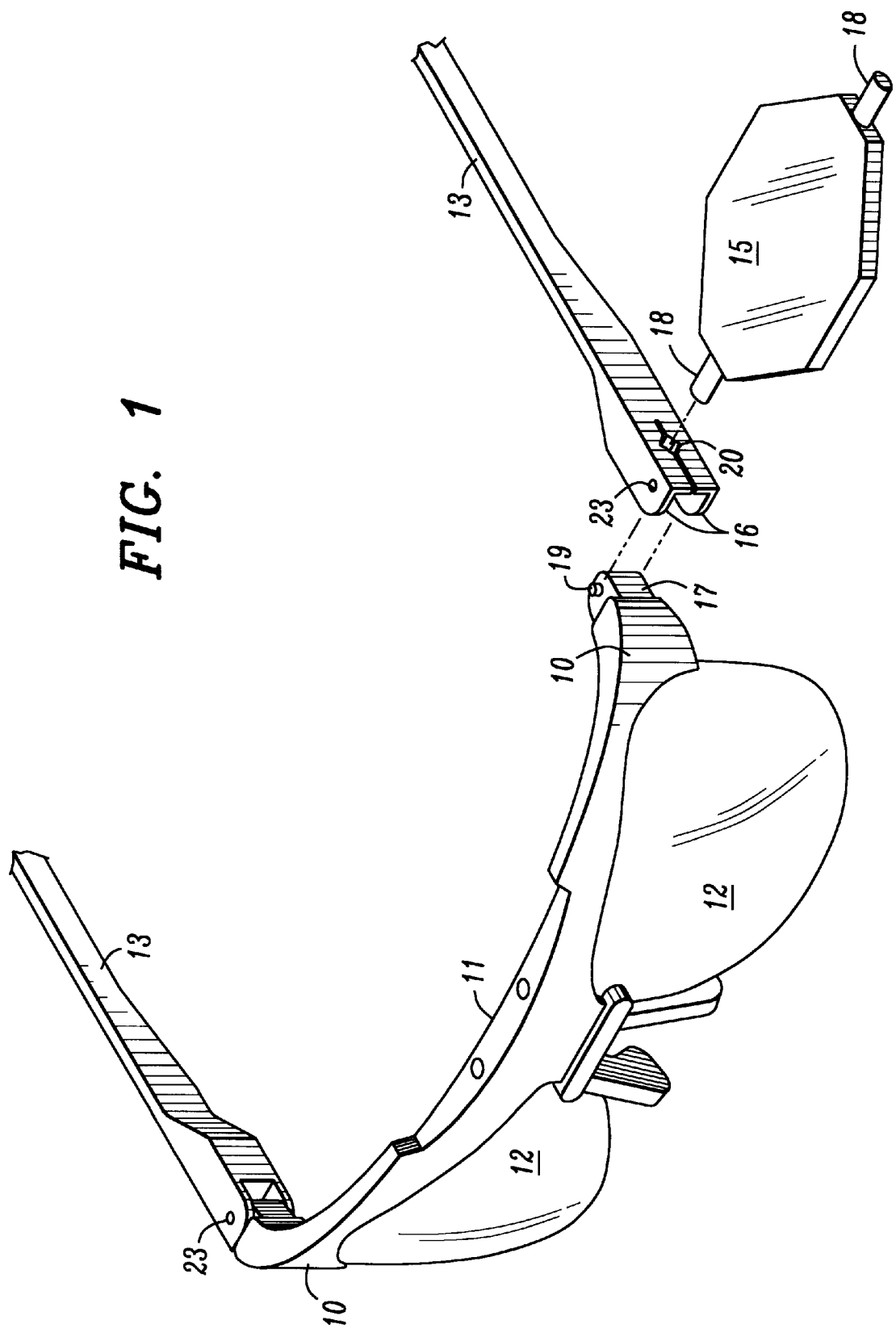
FIG. 1 is a top right front isometric exploded view of the present invention and retraction key.

Referring now to FIG. 1, the present invention shows eyewear, for example sunglasses, in which the hinge joint of the present invention has been employed. The main frame 11 holds lenses 12 and has rounded corner pieces 10 at each side that curve backward and terminate in a rearward-extending lug 17 with vertically-extended hinge pins 19. Open channels at the front of right and left temple bars 13 are fitted about the frame lugs by the retractable jaws 16. Apertures 23 in each of the jaws 16 fit about the hinge pins once the temple bars are installed. In order to facilitate the retraction of the temple bar jaws 16, a retraction key 15 is provided. The key includes two lobe-shaped shafts 18 at opposite sides of the key, either of which can be inserted into keyhole 20. The shape of the keyhole is compatible with the lobe shape of shaft 18 which is substantially elliptical. By turning the retraction key, the temple bar jaws are spread apart and the end of the temple bar may then be positioned over the hinge pins. The retraction key is then turned again to relax the temple bar jaws so that the hinge pins fall into hinge pin holes 23 for positive securement of the temple bars to the eyeglass frame. The key is then removed and stored in a convenient place. This procedure provides a zero insertion force of the hinge pins which are therefore less susceptible to wear or damage when being exchanged. Furthermore, because the hinge pins may have straight-cut ends, the result is a stronger joint with greater operative hinge pin surface area.

Figure 2:
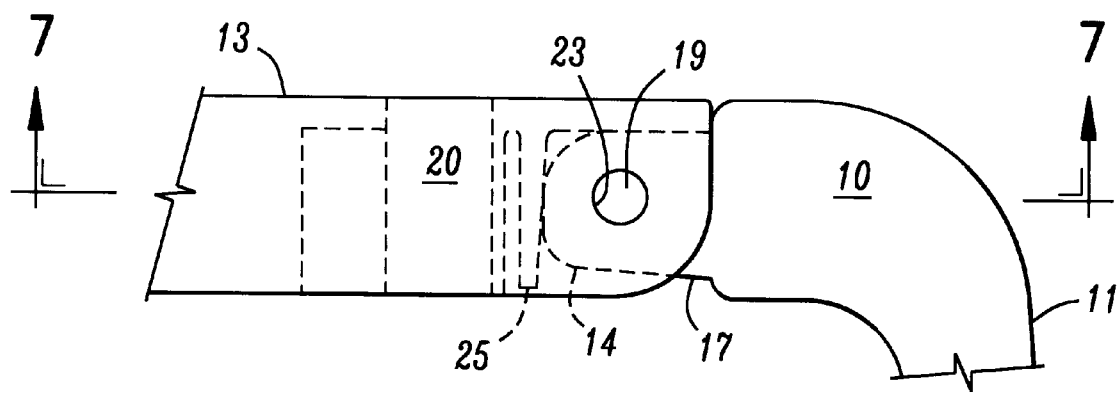
FIG. 2 is a plan view of the right side temple hinge joint shown in FIG. 1.

Referring now to FIG. 2, greater detail of the hinge joint is shown. The frame 11 includes lug 17 which has a hinge pin 19 that correspond to hinge pin hole 23 in the temple bar 13. The pin may be either integrally molded or a separate metal insert. Keyhole 20 passes completely through temple bar laterally. The rear-facing nose of frame lug 17 includes a cam surface 14 which interacts with leaf springs 25 integrally molded with the temple bar. The cam and leaf springs are further described with regard to FIGS. 4-6 below.

Figure 3:
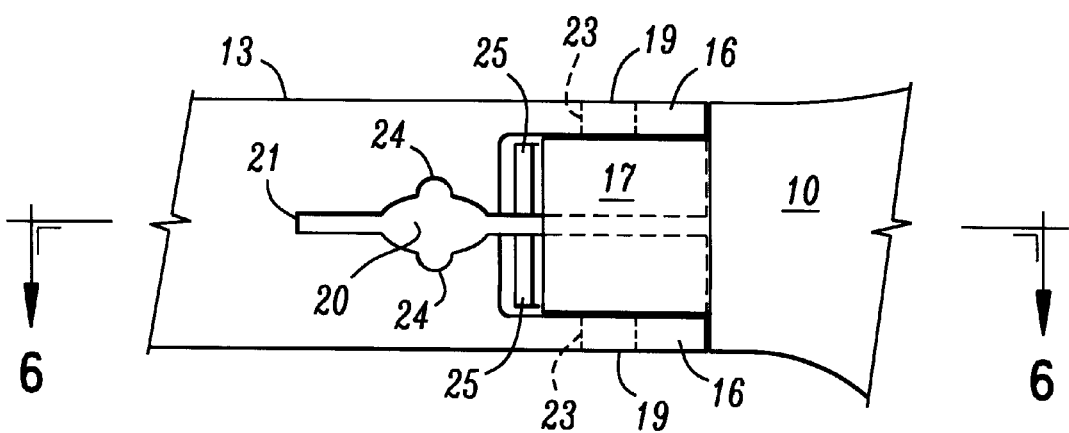
FIG. 3 is a right side view of the right side hinge joint shown in FIG. 2.

Referring now to FIG. 3, the left side view of the left-hand hinge joint is shown. Temple bar 13 includes a slot 21 which divides the end of the temple bar into top and bottom jaws 16. In this figure, the corner piece 10 is shown secured to temple bar 13 with lugs 17 having top and bottom hinge pins 19 securely fitted into corresponding top and bottom hinge pin apertures 23. The slot divides the spring into separate top and bottom leaves 25, one on each jaw. It also includes an enlarged portion 20 which forms an elliptically-shaped keyhole. The keyhole further includes top and bottom notches 24 whose operation will be more fully explained with regard to FIGS. 7 and 8.

Figure 4:
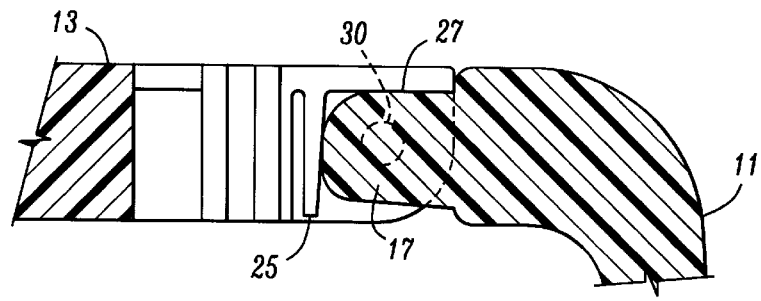
FIGS. 4–6 are plan sectional views taken from FIG. 3 with the temple bar shown in alternate positions with regard to the frame.
Figure 5:
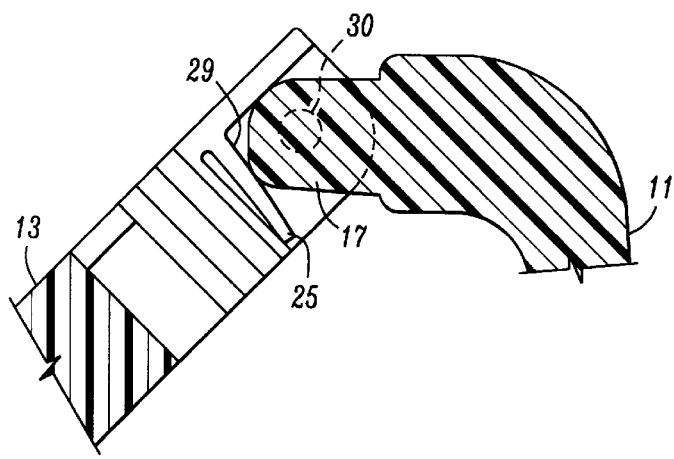
Figure 6:
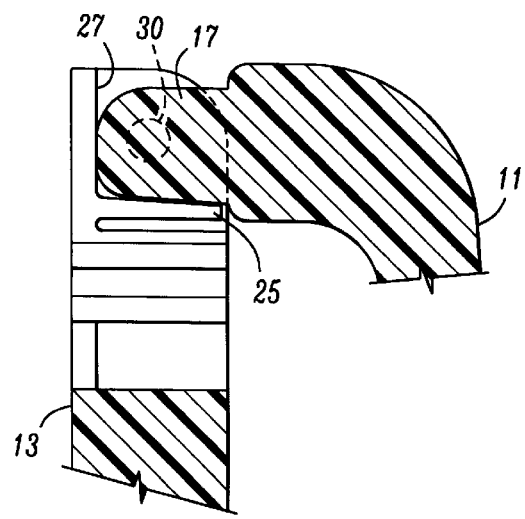

As depicted in FIGS. 4-6, the hinge joints permit the temple bars to move between open and folded positions rotated about cam axis 30 alternately biased in the direction of either position. Referring now to FIG. 4, the temple bar 13 is shown in its open position with regard to frame lug 17. In this position, the rearward-facing cam surface of frame lug 17 rests against leaf spring 25 without deflection of the spring. Also in this position, a flat portion of the cam lobe rests against the flat inside side surface 27 of the temple bar, which acts as a positive stop to restrict further opening. Thus, the temple bar is captured in this fixed open position, unless the leaf spring is deflected by rotating the temple bar toward the folded position. Nearby movements of the temple bar from this position will cause the spring to deflect and urge the temple bar back to the open position.

Referring now to FIG. 5, the temple bar 13 is seen rotated approximately 45-degrees about cam axis 30 toward the folded direction with regard to the frame member 11. In this position, a high point 29 on the cam portion of the frame lug 17 causes the leaf spring 25 to bend to its point of maximum deflection. Movement of the temple bar 13 past this point of rotation will cause the temple bar to spring farther forward to its folded position.

FIG. 6 shows the temple bar rotated to a fully-folded state approximately parallel to frame 11 with areas of the cam surface on lug 17 lying against the flat side surface of the temple frame 27 and with the leaf spring 25 not deflected. The temple bar 13 is captured in this position, unless the leaf spring is deflected by rotating the temple bar. From this point, nearby movement about cam axis 30 in the open direction less than 45-degrees will cause the temple bar 13 to spring back to its folded position. Thus, it will be readily understood by those of ordinary skill in the art from this description and FIGS. 4-6 that the leaf spring and cam structures operate to bias the temple bars into either of two stable states, the fully opened position in FIG. 4 or the fully folded position shown in FIG. 6.

Figure 7:
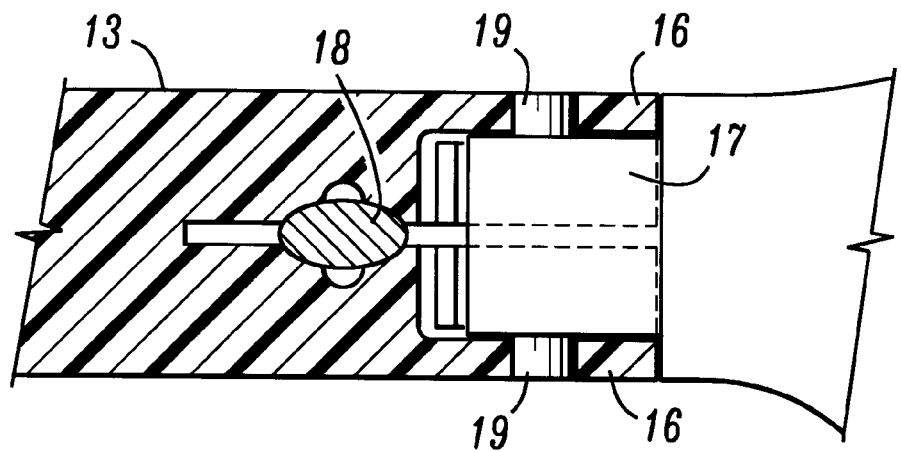
FIGS. 7 and 8 are side sectional views taken from FIG. 2 as shown in that figure with the retraction key in alternate positions.
Figure 8:
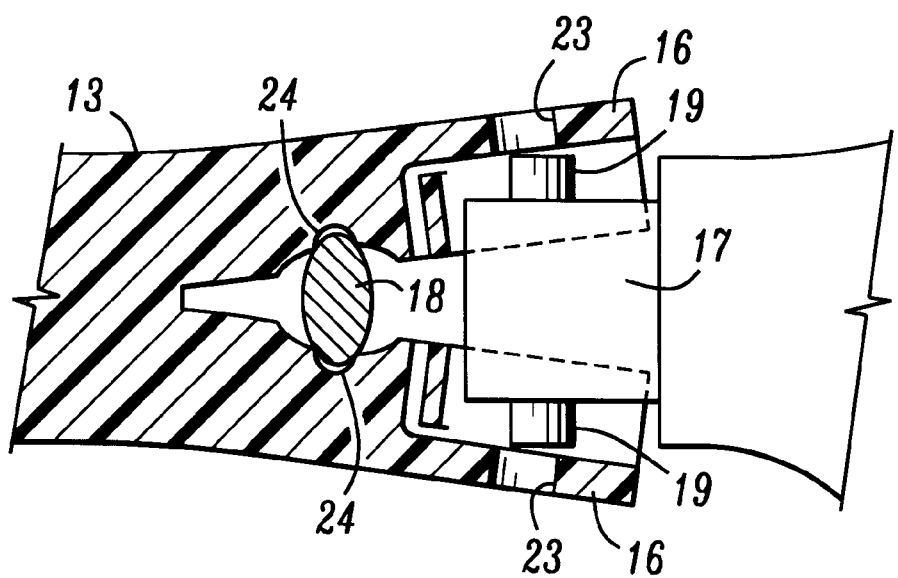

Referring now to FIGS. 7 and 8, alternate positions of the temple bar jaws and the retraction key 18 are shown. In FIG. 7, the shank of key 18 has been inserted into the side of temple bar 13 with jaws 16 in their closed condition about frame lug 17. In this position, the hinge pins 19 remain securely fitted within corresponding holes in the temple bar jaws. By rotating the retraction key 18, the temple bar jaws are spread apart as shown in FIG. 8. It will be fully appreciated that the smooth eliptical surfaces of the key shank and the keyhole provide smooth actuation with great mechanical leverage. In the position shown in this figure, the retraction key is rotated to the point where the sides of the key shank lobe have entered top and bottom notches 24 in the keyhole aperture. This securely holds the key from rotating in either direction and it becomes firmly grasped between the resilient jaws of the temple bar. Therefore, the key no longer needs to be manually held as the temple bar and the frame are handled. This position of the key also holds the jaws apart sufficiently so that the hinge pins 19 are free from holes 23 in the jaws and the temple bar is thereby detacted from the frame. A new frame with a corresponding lug and hinge pin structure may now be substituted and the retraction key rotated again approximately 90-degrees in either direction so that it returns to the position shown in FIG. 7. The key is then removed from the temple bar and the frame is now hingeably attached. It should be understood that conversely the same eyeglass frame may be retained while different temple bars are substituted by the same operation of utilizing the retraction key to selectively spread and relax the temple bar jaws.

Figure 9:
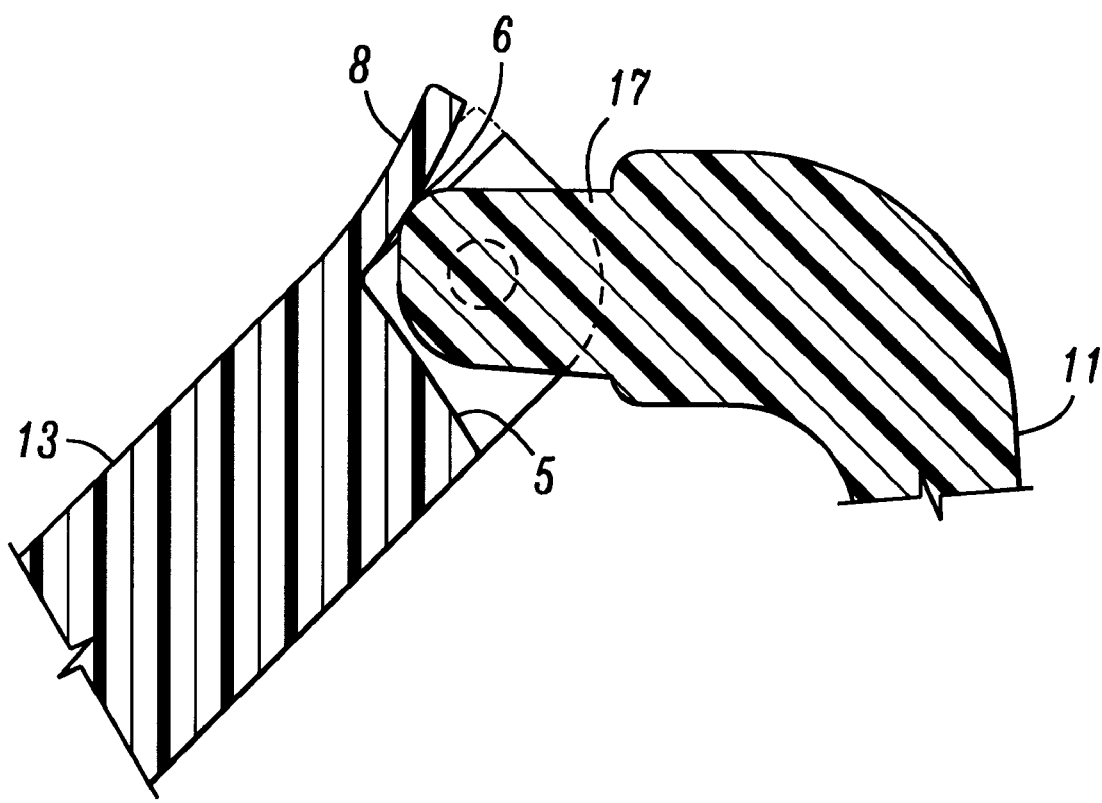
FIG. 9 is a plan sectional view of an alternate embodiment of the present invention.

Referring now to FIG. 9, an alternate embodiment of the present invention is shown. In this embodiment, the rotational stop and leaf spring structures at the end of the temple bar that cooperate with the cam surface of the frame lug have been reversed. This provides the same temple arm spring-biasing which urges the temple bar into the same preferred positions of either fully opened or fully closed from a central dead center point. This is achieved by moving the cam high point 6 on the frame lug 17 approximately 90-degrees in the direction of the outside of the frame lug 17. The tip of the temple side of the temple bar at the end 8 is slit, top and bottom, so that when contacted by the cam high point 6 it deflects, acting as a biasing leaf spring. The laterally-projecting surface 5 across the temple bar in this embodiment serves as a rotational stop which contacts the frame lug when the temple bar is in its fully-folded position. This is the structural reverse of the same functional features found in the embodiment shown in FIGS. 4, 5 and 6 in which the laterally-projecting surface of the temple bar which contacted the cam lug functions as a spring member and the side edge of the temple bar functions as a rotational stop. While either embodiment may be utilized successfully, the construction shown in FIG. 9 may lend itself to greater economies of manufacture.

It will be apparent from the foregoing that great mechanical leverage may be obtained by using the key-operated temple bar spreading system of the present invention. Among other benefits, this permits a much stronger and durable material to be used than what would otherwise be possible with other snap-on hinge systems. The preferred material is a high melting point thermoplastic which is lightweight and durable, such as the material known as Grilamid®, produced by EMS-CHEME, AG, well-known in the art. This provides not only a stronger hinge joint once installed, but provides a material which is also strong enough to include an integrally-molded leaf spring structure which biases the temple bars in an open or folded condition as explained above. Thus, structures of the present invention can be integrally molded with their respective pieces without the need for additional parts. Thus, many advantages over the prior art are achieved by the novel and unobvious features of the present invention described above.

It should be understood that the above description discloses specific embodiments of the present invention and are for purposes of illustration only. There may be other modifications and changes obvious to those of ordinary skill in the art that fall within the scope of the present invention which should be limited only by the following claims and their legal equivalents.

What is claimed is:

1. Eyewear, comprising:
   a frame supporting a lens;
   two corner pieces, each located at opposite sides of said frame, said corner pieces each including a rear-facing lug;
   two temple bars, each detachably affixed to one of said rear-facing lugs;
   hinge means affixed to each of said lugs for hingeably connecting said lugs to corresponding attachment means on said temple bars;
   a pair of retractable jaws located at the front end of each of said temple bars;
   a slot through each of said temple bars dividing said jaws, said slots lying substantially along a longitudinal axis of each temple bar; and
   a keyhole through each temple bar centered within each of said slots such that jaws on each temple bar are spread apart by turning a key inserted into the keyholes, whereby said frame and said temple bars are detached.

2. The eyewear of claim 1, wherein said hinge means are pins.

3. The eyewear of claim 2, wherein said keyhole is substantially elliptical.

4. The eyewear of claim 3, wherein top and bottom surfaces of said keyhole include notches for receiving the side edges of a shank of said key.

5. The eyewear of claim 4, further including a removable key having a shank with an elliptical profile.

6. The eyewear of claim 1, wherein said temple bar attachment means are holes through each jaw which receive hinge pins.

7. The eyewear of claim 6, wherein said slots extend forward through the front edge of said temple bars.

8. Eyewear, comprising:
   a frame supporting a lens;
   two corner pieces, each located at opposite sides of said frame, said corner pieces each including a rear-facing lug:
   two temple bars, each detachably affixed to one of said rear-facing lugs:
   hinge means affixed to each of said lugs for hingeably connecting said lugs to corresponding attachment means on said temple bars being a portion thereof, whereby said temple bars may rotate with respect to said frame between an open position and a folded position;
   a cam surface with an axis of rotation on each of said lugs;
   leaf spring means unitary with said temple bars, whereby said spring means are displaced by contact with said cam surface as the temple bars are rotated about the cam axis such that temple bars are resiliently biased toward said folded position when nearby said folded position and are biased toward said open position when nearby said open position; and
   a pair of retractable jaws located at the front end of each of said temple bars, each jaw including individual leaf spring means separated by a slot extending laterally entirely through each of said temple bars lying substantially along a longitudinal midline of each temple bar and extending through the front edge thereof.

9. The eyewear of claim 8, wherein each lug has a cam surface having an apex located at a point on said cam surface along a line forming an angle of approximately 45-degrees with a line through said cam axis parallel to a front surface of said frame.

10. The eyewear of claim 8, further including a keyhole through each temple bar centered between each of said slots, such that jaws on each temple bar are spread apart by turning a key inserted into the keyholes whereby said hinge means and said attachment means are disconnected.

11. The eyewear of claim 8, wherein said temple bars and said frame are molded from a thermoplastic material, said spring means being a unitary structure of said temple bars.

12. The eyewear of claim 8, wherein said spring means extend from the outer side edges at the front of said temple bars.

13. The eyewear of claim 8, wherein said leaf spring means extend perpendicularly to the longitudinal axis of the temple bars.

* * * * *